UNITED STATES PATENT OFFICE.

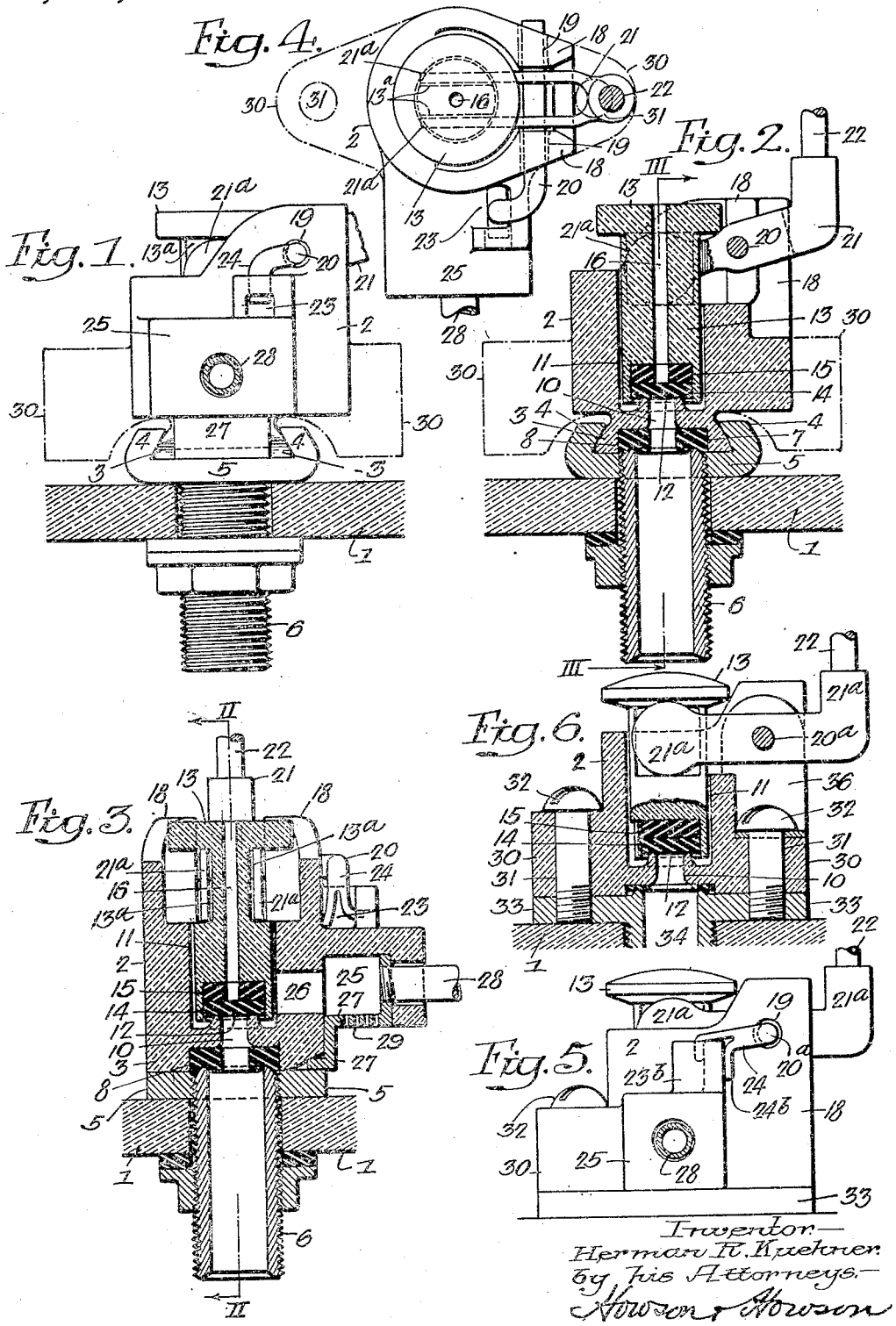

HERMAN R. KUEHNER, OF CAMDEN, NEW JERSEY.

BALL-COCK.

1,361,879.

Specification of Letters Patent.　Patented Dec. 14, 1920.

Continuation of application Serial No. 258,614, filed October 17, 1918. This application filed September 18, 1919. Serial No. 324,327.

*To all whom it may concern:*

Be it known that I, HERMAN R. KUEHNER, a citizen of the United States, residing in Camden, Camden county, New Jersey, have invented certain Improvements in Ball-Cocks, of which the following is a specification.

My invention relates to the ball cock structures of flush tanks, usually employed for flushing water closets, urinals and the like; although available for use with other liquid receiving tanks having float-controlled valves for cutting off the flow when a predetermined amount of liquid has entered the same. One object of my invention is to provide a structure made wholly or substantially of non-metallic parts with a view of avoiding the deleterious effect which the waters of some localities and other liquids have upon metal structures and fittings usually employed for this purpose.

A further object of my invention is to provide a structure simple in design and mode of operation, and one that is readily attached to and detached from a tank, and a further object of my invention is to provide a structure of this general type that is less likely to be affected from the liquid with which it is employed than the metal structures heretofore in use.

To accomplish these ends, I propose to provide a structure in which all of the parts, or substantially all of them, shall be of non-metallic material, and while there are, perhaps, many materials which might be employed for the purpose, I prefer to make the structure constituting my invention of some form of vitreous earthenware, such as china, or porcelain, or in some instances of glass.

In assembling a structure so made, it may be necessary in some instances and desirable in others to employ parts of other materials with the vitreous parts and, of course, it may be desirable or necessary to employ elastic gaskets between various parts of the structure to insure water-tight joints; all of which is within the scope of my invention.

These and other features of my invention are more fully described hereinafter, reference being had to the accompanying drawings, in which:

Figure 1, is a view in elevation showing one form of valve structure within the scope of my invention positioned with reference to the bottom of a flush or other tank with which it may be employed.

Fig. 2, is a sectional elevation of the same on the line II—II, Fig. 3.

Fig. 3, is a sectional elevation on the line III—III, Fig. 2.

Fig. 4, is a plan view of the structure shown in Fig. 1.

Fig. 5, is a side elevation of a modified construction within the scope of my invention, and Fig. 6, is a sectional elevation of the structure shown in Fig. 5.

In the accompanying drawings, 1 may represent the bottom wall of a flush tank with which my improved ball cock structure may be employed, and such tank may be of any ordinary construction and made of any suitable material. The body of my improved ball cock structure is shown at 2, and the lower part of the same may be provided with a dovetail projection 3 adapted to fit between the undercut walls 4 of a metal plate 5; such metal plate receiving a threaded pipe section 6, to which the pipe for the inlet of water (not shown) may be attached. If desired, the threaded pipe section 6 may be integral with the metal plate 5.

The dovetail projection 3 is recessed on the underside as at 7, and adapted to this recess is a compressible gasket 8, with which the end of the pipe section 6 engages to insure a water-tight joint at this point. If these parts are integral, the plate 5 will be provided with a seat for engagement with the gasket. The gasket 8 is apertured for the passage of liquid from the pipe section 6, and the bottom wall of the body of the ball cock structure is similarly apertured at 10 in line therewith.

The body of the ball cock structure is provided with a passage or chamber 11 having a seat 12 near the lower portion of the same for engagement by a valve stem 13 vertically movable in said passage, and said valve stem is preferably provided with a gasket 14 at its lower end for engagement with the seat 12; such gasket being frictionally held in a recess in the end of said stem. Usually I provide a gasket such as 14 for contact with the seat, with a filler gasket 15 between the same and the bottom of the recess in the valve stem. The valve stem may be perforated at 16 so as to facilitate dislodgment of the gasket 14 when it is necessary to replace the same. To avoid dislodgment of the filler gasket at the same time, it may also be perforated as indicated in the drawings. In lieu of this arrangement, the stem 13 may be cut away at 16ª whereby access may be gained to remove the washer or washers when renewal is necessary, as shown in Fig. 6.

Projecting above the body of the valve structure are ears 18, which may be apertured at 19 for the reception of a pin 20, upon which is pivotally mounted a lever 21 for operating the valve stem 13, and such lever may carry the usual rod 22, to the opposite end of which may be attached the usual ball float (not shown). To avoid displacement of the pivot pin 20, the body of the valve structure may be provided with an external pocket or recess 23 at one side of the same to receive a projecting arm 24 carried by said pin, and if desired, the end of the latter may be split, as clearly shown in Fig. 3. Additionally, the pocket or recess may have an aperture 23ª in its wall into which one of the prongs 24ª of the split portion of the pin may be forced if desired, as indicated in Fig. 3.

In the present instance the lever for operating the valve stem is shown as having a yoked end 21ª to embrace the stem 13, which is reduced at 13ª, as clearly indicated in the drawings.

At one side of the valve body, I preferably provide a chamber 25, into which the inflowing water passes from the chamber 11 through an outlet port 26, and within this chamber I preferably place a baffle 27, which is preferably of metal connected to an after-fill pipe 28. This baffle may be substantially Z-shape in cross-section, and one wall is preferably perforated at 29 whereby the water may discharge into the tank; the sound of the inflow being materially reduced by the use of perforations. The lower end 27ª of this baffle plate may be caught between the body of the ball cock structure and the plate 5.

The structure shown in Figs. 1, 2, 3 and 4, is designed to be secured to the tank through the medium of the dovetail projection on the under side of the valve body. In some instances it may be desirable to secure the structure to the tank by other means, and I have illustrated by dotted lines projections for the reception of securing screws which may be carried by the valve body; these projections being illustrated in Figs. 1, 2 and 4.

In Figs. 5 and 6, I have shown a valve structure of this general type provided with projections 30 apertured at 31 for the reception of screws 32 whereby the body may be attached to the usual metal fitting 33 having a threaded stem 34, passing through the wall of the tank and to which the water supply pipe (not shown) may be secured. Additionally, this form of ball cock structure may be provided with a yoke piece 36, usually of metal, through which one of the securing screws may pass and to which the operating lever 21ª may be pivotally connected. The pin 20ª upon which this lever is hung may have a pronged end 24ᵇ, as shown in Fig. 5, and such prongs may be bent to engage the wall of a pocket or recess 23ᵇ at the side of the body structure, as shown in Fig. 5.

In all instances, the body and stem of the structure is made of vitreous material, china, porcelain, earthenware or the like, or glass.

As this application contains matter in common with an application filed October 17, 1918, Serial No. 258,614, it is to be treated as a continuation of such earlier application in so far as the common subject-matter is concerned.

I claim:

1. A ball-cock valve-structure comprising a hollow body of vitreous material with internal and external seats, a valve stem of vitreous material operable within said body and having a gasket adapted to engage one of said seats, an external water supply connection, and a gasket disposed between the same and the external seat of the valve body.

2. A ball-cock valve-structure comprising a hollow body of vitreous material with internal and external seats, a valve stem of vitreous material operable within said body and having a gasket adapted to engage one of said seats, an external water supply connection, a projection carried by the valve body for coöperative engagement therewith, and a gasket disposed between the water supply connection and the external seat of the valve body.

3. A ball-cock valve structure comprising a body of vitreous material with an internal valve seat, and a valve stem of vitreous material operable within said body and having a gasket disposed in an end recess of the same and adapted to engage said seat; said valve stem being hollow for the insertion of a rod to dislodge the gasket from the recess when the same is worn.

4. A ball-cock valve structure comprising a body of vitreous material with an internal valve seat, a valve stem of vitreous material operable within said body and having an end recess, a gasket disposed in said recess and adapted to engage said seat; said valve stem being hollow for the insertion of a rod to dislodge said gasket.

5. A ball-cock valve-structure comprising a porcelain body, a metal fitting for the lower portion of the same; said body having a seat adjacent said fitting, and a flexible gasket interposed between the fitting and said seat.

6. A ball-cock valve-structure comprising a porcelain body, a dovetail projection carried by the lower portion of the same, a metal fitting therefor; said body having a seat formed in its under side adjacent said fitting, and a flexible gasket interposed between the fitting and said seat.

7. A ball-cock valve-structure comprising a porcelain body having a projection on its under side, a metal fitting engaging said projection; said body having a seat adjacent said fitting, a flexible gasket interposed between the fitting and said seat; the body being also recessed, a valve seat at the bottom of said recess, and a valve stem of porcelain vertically movable in said recess.

8. A ball-cock valve-structure comprising a porcelain body having a dovetail projection on its under side, a metal fitting carried by the water supply connection engaging said projection; said body having a seat formed on its under side adjacent said fitting, a gasket interposed between the fitting and said seat; the body being also recessed, a valve seat at the bottom of said recess, a valve stem of porcelain vertically movable in said recess, and a removable washer carried by said valve stem for engagement with said valve seat.

9. A ball-cock valve-structure comprising a hollow porcelain body having a dovetail projection, a metal fitting engaging such projection; said body having a seat adjacent said fitting, a gasket interposed between the fitting and said seat; the hollow body having a valve seat at the lower portion of the same, a valve stem of porcelain within said hollow body, and a lever for operating said valve stem.

10. A ball-cock valve-structure comprising a hollow porcelain body having a dovetail projection, a metal fitting carried by the water supply connection and engaging such projection; said body having a seat formed on its under side adjacent said fitting, a gasket interposed between the fitting and said seat; the hollow body having an internal valve seat at the bottom of its internal chamber, a valve stem of porcelain within said hollow body, a removable washer carried by said valve stem for engagement with said seat, and a lever for operating said valve stem.

11. A ball-cock valve-structure having a body of vitreous material with an interior chamber having a seat, a valve stem having a gasket adapted to engage said seat, an outlet passage communicating with said interior chamber, and a perforated baffle mounted in said outlet passage.

12. A ball-cock valve-structure having a body of vitreous material with an interior chamber having a seat, a valve stem having a gasket adapted to engage said seat, an outlet passage communicating with said interior chamber, a perforated baffle mounted in said outlet passage, and an overflow pipe connected to said baffle.

13. A ball-cock valve-structure having a body of vitreous material, an interior chamber having a seat, a porcelain valve stem having a gasket engaging said seat, a lever for operating said valve stem, and a pivot pin upon which said lever is journaled; said pivot pin having its end spilt for engagement with a part of the valve body.

14. A ball-cock valve-structure having a body of vitreous material, an interior chamber having a seat, a porcelain valve stem having a gasket engaging said seat, a lever for operating said valve stem, a pivot pin uon which said lever is journaled; said pivot pin having its end split, and a wall externally disposed with respect to the valve body over which all or a portion of said split end may be hooked.

HERMAN R. KUEHNER.